United States Patent
Gentile et al.

[11] 3,931,497
[45] Jan. 6, 1976

[54] AUTOMATED FUEL DISPENSER

[75] Inventors: Fred J. Gentile, Dallas; Martin D. Cothran, Euless, both of Tex.

[73] Assignee: Docutel Corporation, Dallas, Tex.

[22] Filed: Oct. 19, 1973

[21] Appl. No.: 408,092

[52] U.S. Cl. .................... 235/61.7 B; 340/149 A
[51] Int. Cl.² .. G06K 5/00; G06K 15/00; H04Q 5/00
[58] Field of Search ............. 235/61.7 B; 340/149 A

[56] References Cited
UNITED STATES PATENTS

| | | | |
|---|---|---|---|
| 3,632,983 | 1/1972 | Yamawaki et al. | 235/61.7 B |
| 3,657,702 | 4/1972 | Stephenson, Jr. | 235/61.7 B |
| 3,665,397 | 5/1972 | Napoli et al. | 235/61.7 B |
| 3,705,384 | 12/1972 | Wahlberg | 235/61.7 B |
| 3,778,595 | 12/1973 | Hatanako et al. | 235/61.7 B |
| 3,786,421 | 1/1974 | Wostl et al. | 235/61.7 B |

*Primary Examiner*—Daryl W. Cook
*Attorney, Agent, or Firm*—Richards, Harris & Medlock

[57] ABSTRACT

An automated fuel dispensing system provides semiattended operation utilizing a computerized credit authorization and billing technique by means of a direct connection to a regional credit center over communication lines. A control console for multiple pump dispensers interconnects with a local central controller for providing preliminary verification checks and generating an authorization request message for transmission to a central computer at the regional credit center. This initial verification is to identify a particular user with a credit document inserted into the control console. Following receipt of an authorization message from the central computer in response to an authorization request, a user selects one of the pump dispensers by actuating a push button at the control console; he then dispenses the amount of fuel desired. Following completion of the fuel dispensing routine, billing information is assembled in the local central controller as a message for transmission to the regional computer for credit billing to a particular account number. In addition to credit documents, the control console accepts currency and cash cards having a pre-established value for control of the dispensing of fuel up to the limit of the currency value or cash card value.

34 Claims, 18 Drawing Figures

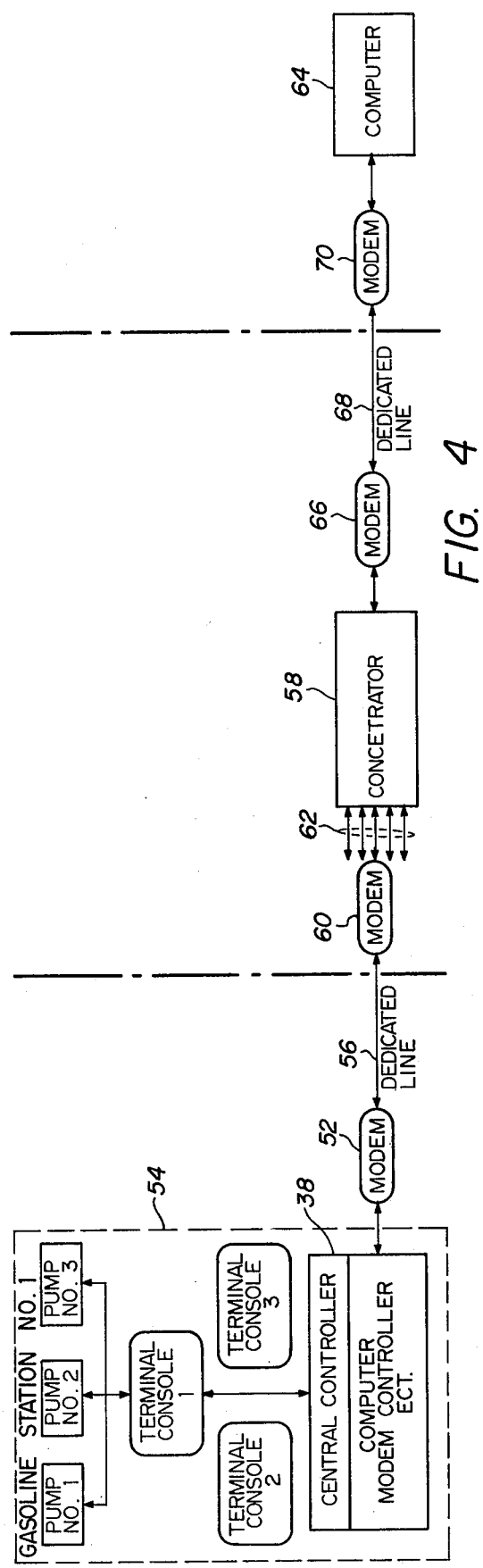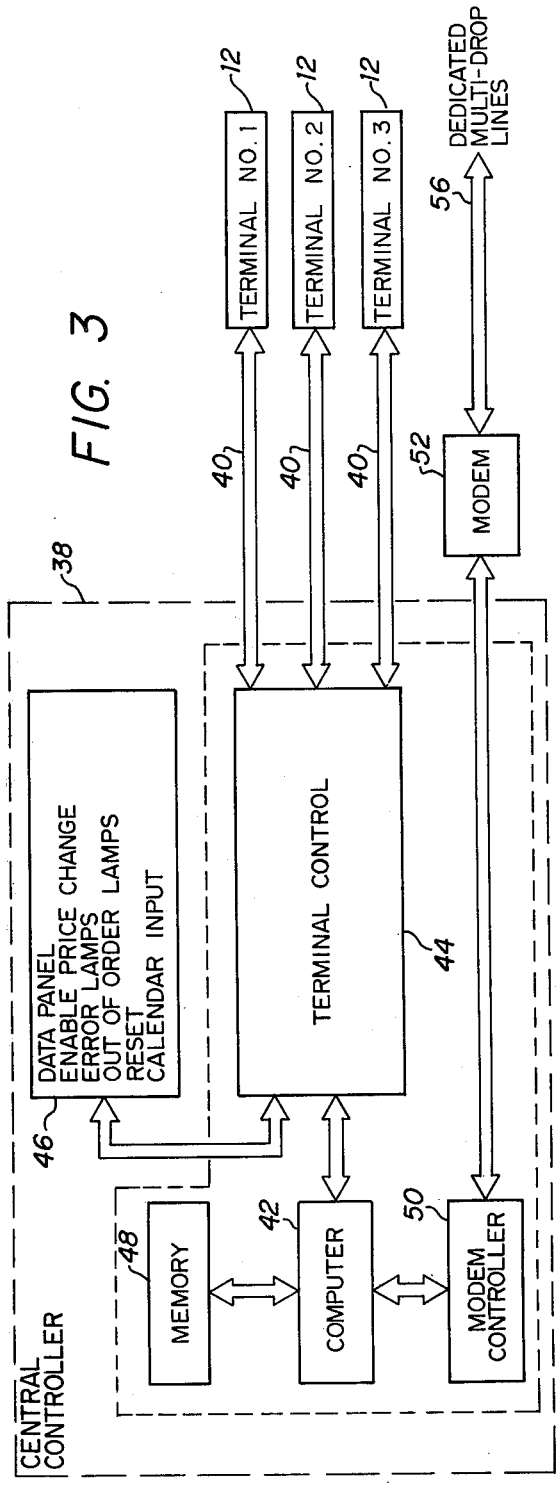

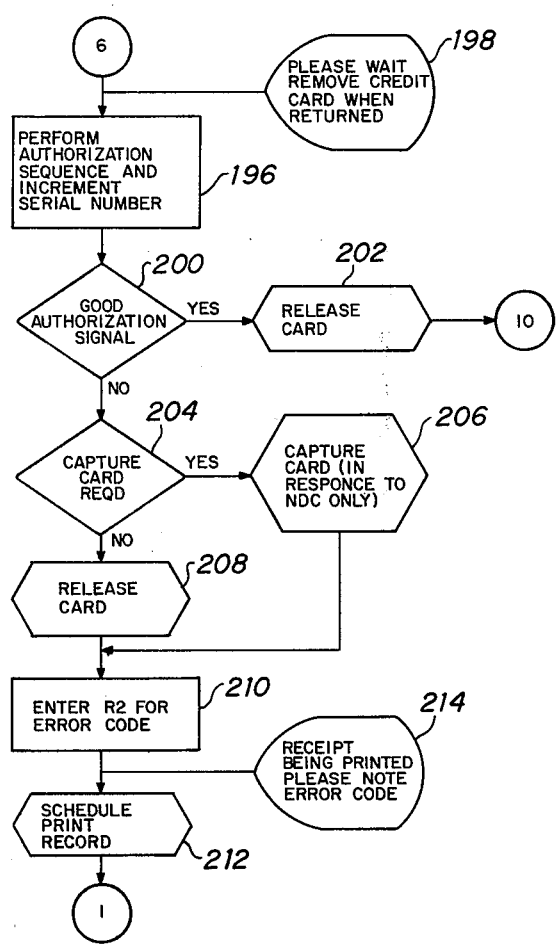
FIG. 11
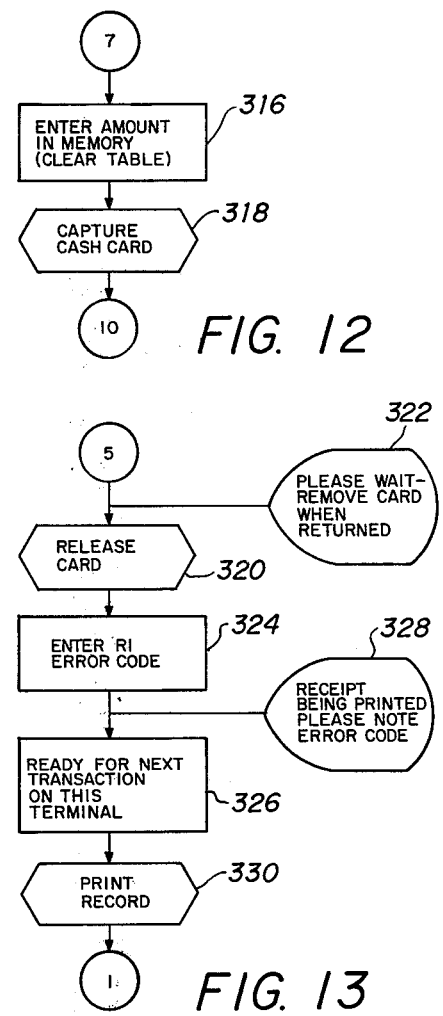
FIG. 12
FIG. 13
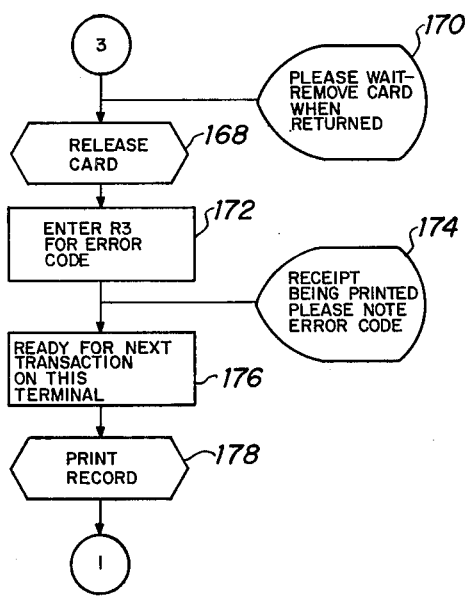
FIG. 15
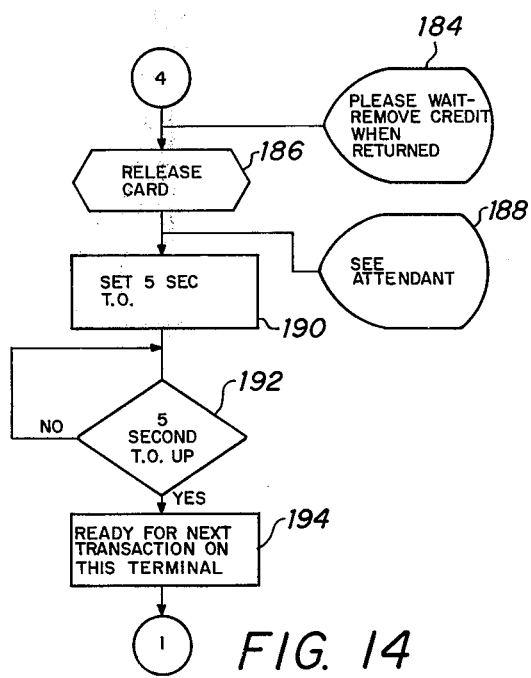
FIG. 14

AUTOMATED FUEL DISPENSER

This invention relates to an automated fuel dispensing system and more particularly to a system and method for dispensing fuel in an automated system employing local verification and central computer authorization in a dispensing transaction.

Recently, attempts have been made to eliminate the expense of attendants in retail merchandising and provide self-service facilities in the marketing and merchandising of certain products. One area where much activity has taken place is in the self-service dispensing of gasoline where the gasoline dispensing is controlled by credit cards, cash cards or currency. However, presently available systems do not provide truly self-service that does not require at least some attention by an attendant. Normally, presently available systems require separate volume readers, albeit at a central location, for the individual fuel dispensing pumps. In these so called self-service stations, the customer pumps his own gasoline and then goes to the attendant at the central control station for billing purposes.

As an alternative, some self-service gasoline dispensing systems utilize pumps equipped with apparatus for accepting and totalizing currency and bills deposited therein which deposit presets a selected pump to deliver an amount of fuel commensurate with the currency inserted into the machine. Such currency operated systems are usually installed in station areas where no attendants are present, and thus station operation may be maintained without interruption.

A feature of the present invention is to provide a self-service dispensing system wherein a transaction is completed by a customer unaided by an attendant. A further feature of the present invention is to provide an automated dispensing system wherein a credit document is locally verified and use thereof is regionally or nationally authorized. Still another feature of the present invention is to provide an automated dispensing system wherein the value of a completed transaction is transmitted to a regional or national control station for billing to an account. Yet another feature of the present invention is to provide an automated dispensing system alternately operated by a credit document, a cash card or currency.

In accordance with the present invention, an automatic document control dispensing system includes remote stations with a communication connection to a regional or national computer. At each of the remote stations there is a control console with a document reader for reading a verification data from the credit document inserted into the console. This verification data is transmitted to a local central controller wherein the authenticity of the presented credit document is verified. Also, for authenticated documents, an authorization request message is generated by the local controller for transmission to the regional or national computer. This authorization request message is transmitted to the regional or national computer on a polling basis and an authorization message is transmitted in the same manner to a selected remote station. Following receipt of an authorization message at a remote station, a selected article is dispensed to a customer.

In operation, the automatic, document controlled, dispensing system of the present invention initially verifies the authenticity of a credit document inserted into a control console at a remote station. Following verification of the credit document, an authorization request message is generated and transmitted to a regional or national computer wherein the account associated with the inserted credit document is reviewed. After the review of a particular account at the regional or national computer in accordance with certain standards, a credit authorization message is transmitted from the regional or national computer to the remote station that previously transmitted the authorization request message. Following receipt of the authorization request message, and the selection by a customer of an article to be dispensed, the value of the selected article is monitored and a value message is generated by the local controller. This monitored value message is then transmitted to the regional or national computer for recording therein to a particular account number.

In addition to credit document operation, an automatic dispensing system in accordance with the present invention operates by currency and cash cards. Operation from either the cash card or currency is similar, and the first step is to totalize the value of the currency or cash card. A total value signal is then compiled by a local central controller which monitors the dispensing of an article up to the desired limit or the limit of the currency or cash card value. When the desired limit is less than the recorded value, a refund receipt is printed for return to a customer.

A more complete understanding of the invention and its advantages will be apparent from the specification and claims and from the accompanying drawings illustrative of the invention.

Referring to the drawings:

FIG. 3 is a block diagram of a local central controller at a remote station connected to three terminal consoles each controlling six pump dispensers;

FIG. 4 is a block diagram of a communication network from a remote station to a regional computer;

FIG. 11 is an operational flow chart of the system showing the sequence for a credit document transaction;

FIG. 12 is an operational flow chart of a cash card sequence;

FIG. 13 is an operational flow chart of a sequence of the system when an expired credit document is presented to a terminal console;

FIG. 14 is an operational flow chart of a sequence of the system when an invalid credit document is inserted into the terminal console;

FIG. 15 is an operational flow chart of a sequence of the system of the present invention when a damaged credit document is inserted;

Figure 1:
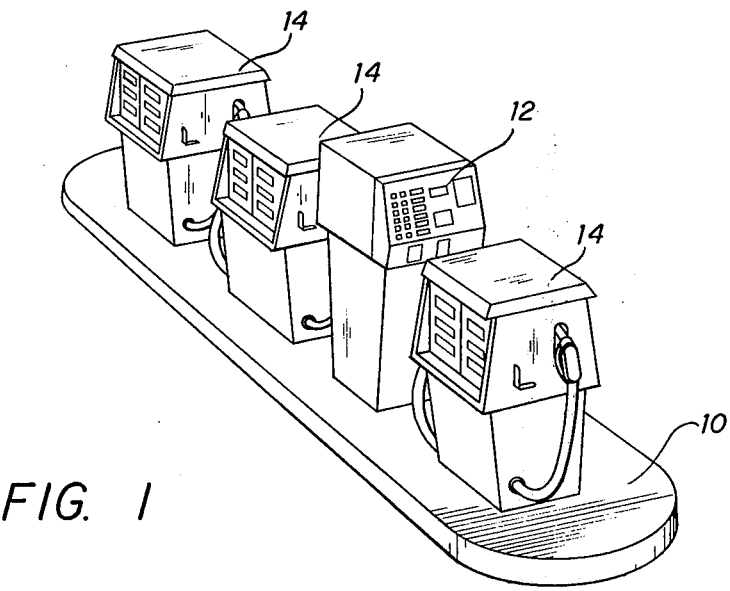
FIG. 1 is a pictorial view of a typical island in a fuel dispensing service station utilizing three dispensing units of two pumps each controlled by a single control console.

Referring to FIG. 1, there is shown a service island 10 containing a terminal console 12, and three dual gasoline pumps 14. Typically, an automated gasoline dispensing station consists of three such service islands each containing a terminal console 12 and three dual gasoline pumps 14. The three dual gasoline pumps 14 are all under the control of the console 12.

Also forming part of a dispensing system is a local central controller and data communications equipment interconnected to all of the service islands of a remote station. Each remote station consists of a local central controller, service islands, and data communication equipment for interconnecting to a regional or national computer that services many remote stations. The regional or national computer provides the added feature of computerized credit authorization and billing directly over dedicated telephone lines.

The dual gasoline pumps 14 are commercially available products commonly known as automatic reset computer pumps having dials to indicate the amount and value of fluid delivered. These pumps are automatically reset to zero indications before each new delivery therefrom. As will be explained, included in each of the pumps is a flow meter responsive to fuel flow and generating output pulses related thereto. Pumps of this design are commonly called "computer pumps".

Figure 2:
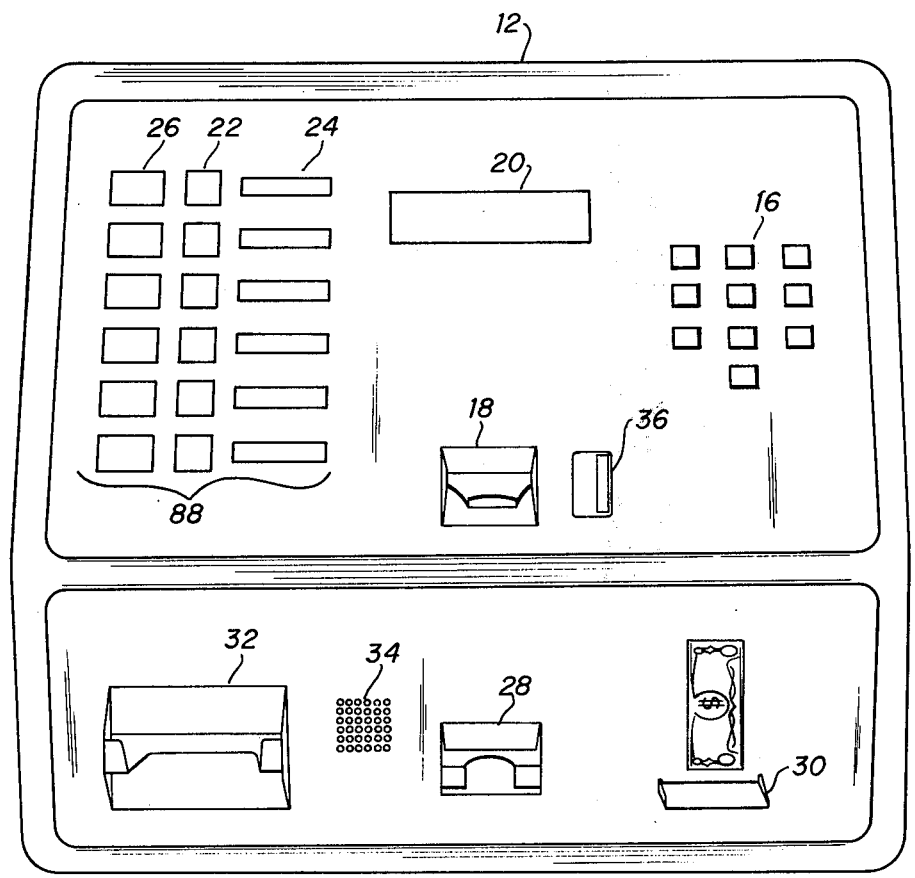
FIG. 2 is a front view of the control console showing operator interface controls.

Referring to FIG. 2, there is shown the front panel of the console 12 on which is arranged an array of ten push button keys in a security keyboard 16 for use by a customer to interface with the remote station central controller for verification of his credit card as inserted into the console through a card gate 18. The keys of the keyboard 16 are marked 0–9 to enable a user to insert his assigned identification code for verification of his authority to use the credit card presented to the machine through the card gate 18.

In addition to the keyboard 16, and the card gate 18, the front panel of the console 12 includes an instruction display 20 that provides for viewing an illuminated display message drum (not shown). As will be explained, the messages on this drum instruct a user in the operation of the system. Another user interface on the front panel of the console 12 is a pump selection array of push button keys 22, each push button having associated therewith a status indicator 24 and an identification label 26. The status indicator 24 for each of the six push button keys 22 is a selectively operated display instructing a user whether a particular pump of the service island 10 is in use or is ready to use. The identification label 26 associated with each of the six push button keys 22 identifies to a user the type of gasoline dispensed from the particular pump associated with one of the push button keys 22. The identification label 26 is a static display established before the system is put into operation.

In addition to the above controls and indicators, the front panel of the console 12 includes in a lower portion thereof a card return throat 28 through which credit cards inserted into the card gate 18 are returned to a user during the completion of a credit card transaction. To the right of the card throat 28 there is a currency gate 30 through which a cash customer inserts bills for operation of the dispensing system.

In the lower left hand corner of the front panel of the console 12 there is a receipt throat 32 through which printed receipts are supplied to a user. Imprinted on each receipt is the amount of gasoline dispensed and the value thereof. For cash customers and customers using cash cards, the receipts also contain refund information when the amount deposited in the console 12 is greater than the amount of gasoline dispensed from one of the pumps 14.

Between the card throat 28 and the receipt throat 32 there is located a grill 34 behind which is mounted a speaker (not shown) for generating audio signals to alert a user to proceed with the operation of a dispensing transaction.

Within the enclosure of the terminal console 12 and associated with the currency gate 30 there is a bill reader for accepting currency inserted through the currency gate. Also included within the housing of the console 12 is a card reader that accepts a credit document through the card gate 18 for transporting past read heads and for transporting to the return throat 28. A printer is also provided in the console 12 for generating the receipt delivered to a user through the receipt throat 32.

Typically, a dispensing system in accordance with the present invention is activated by a standard "A" size plastic credit card, such as indicated by the decal 36, having embossed numeric data, a magnetically encoded data, or both. The embossed lettering and/or magnetic stripe contain a user's account number, an identification code, expiration date data, and other credit data as required to provide secured credit card transactions.

In an embodiment of the system using an embossed credit card, the card reader transports a credit card inserted through the card gate 18 on the console front panel to a read area wherein the raised characters are read and identified along with certain defined spaces between characters. This verification data is communicated to the remote station central controller for further processing. Embossed card readers of this type are commercially available and have the capability of capturing a fraudulent or altered card, or an excessively worn card. After processing, the card reader returns the inserted credit card to a user (if valid) through the return throat 28. In addition, the card reader utilized in the present system also accepts cash cards and reads the value thereof and this information is also transmitted to the local central controller.

The currency reader associated with the currency gate 30 is also a commercially available product and may be of the type identified as a NRI Model 34-0-4-006 Dollar Bill Reader. A dollar bill is inserted into the gate 30, is read, passed through the unit, and deposited in a currency storage chest in the lower enclosure of the console 12. The bill reader is self-contained and will provide contact closures each time a genuine dollar bill is read into the unit. These contact closures are transmitted to the remote station central controller where the total number of dollar bills accepted by the terminal is totalized.

The instruction display 20 provides for fifteen separate instruction messages to guide a customer through a transaction, see Table I for a list of the instruction messages. The mechanism itself consists of a message drum, a display drive motor, and message illumination lamps, and associated wiring.

TABLE I

| | |
|---|---|
| 1. | Insert Credit Card or dollar bill |
| 2. | Enter your personal identification code |
| 3. | Please wait - Remove Credit Card when returned |
| 4. | Press pump select button |
| 5. | Receipt being printed - Please note error code |
| 6. | Remove Credit Card and insert again |
| 7. | Go to pump and dispense Fuel |
| 8. | See attendant |
| 9. | When all $1 bills inserted press pump select button |
| 10. | Receipt for pump No. 1 now being printed |
| 11. | Receipt for pump No. 2 now being printed |
| 12. | Receipt for pump No. 3 now being printed |
| 13. | Receipt for pump No. 4 now being printed |
| 14. | Receipt for pump No. 5 now being printed |
| 15. | Receipt for pump No. 6 now being printed |

A transaction receipt is printed and delivered to the receipt throat 32 during each transaction cycle to provide both the user and the remote station owner with a transaction record. The printer is a self-contained assembly commercially available and removable as a unit.

The pump select portion of the front panel of the console 12 consists of the six momentarily "on" push button keys 22, six solenoid actuated pump status indicators 24 and the six fuel grade displays 26. The push button keys are numbered 1–6 and are used to select any one of the six pumps associated with a particular console terminal. The pump status indicators are two-position rotary devices, solenoid actuated, such that when energized, they rotate and position a message "available" in a viewing window. When the actuating solenoid is de-energized, the rotary device returns to the home "in use" position.

Referring to FIG. 3, there is shown a block diagram of a central controller 38 interconnected to three terminal consoles 12 through data lines 40. The central controller (located in an attendant building) is an electronic module containing a computer 42 and associated subunits including a terminal controller 44 having three discrete input/output boards, one for each terminal console 12. Also associated with the computer 42 is a data panel 46 incorporating system status/fault monitoring, and system update hardware. Interconnected with the computer 42 is a memory 48 and a "modem" controller 50. Typically, the central controller contains a Computer Automation Inc., Alpha 16 Computer consisting of the following subunits:
 1. A central processing unit,
 2. An 8 K–16 bit memory 48,
 3. A real time clock,
 4. Power failure/restart circuits,
 5. A power supply,
 6. The modem controller 50,
 7. An operator's console, and
 8. Teletype interface (optional).

Any information generated in the terminal console 12 is transmitted to the computer 42 through the terminal control 44 used as a data collector/transmitter. By appropriate multiplexing circuitry, the controller 44 operates in such a manner such that the computer 42 appears to be communicating with three separate devices individually.

Also transmitted through the terminal control 44 to the computer 42 is data generated in the data panel 46 which contains status and fault indicators, an operational push button, data entry thumb wheels (such as calendar inputs), and various test points. Controls for the data panel 46 are used for data entry related to the year, month, day and time. In addition, the data panel includes indicators for monitoring the status of the terminal consoles 12. Additionally, thumb wheels on the data panel 46 enable price changing for all the terminals, provide station identification numbers to be input to the central controller, and enable the printer in each terminal console 12 to print out accumulated totals for the terminals. The system may also be reset and restarted by a thumb wheel or push button switch.

Each remote station is connected to a regional computer for transaction authorization and account crediting. To accomplish the interconnection between the computer 42 and the regional computer, the "modem" controller 50 is included as a subunit for the computer. The "modem" controller is an asynchronous data set controller providing all signal processing, controls and level conversions to interface the computer 42 with a modem 52. The controller 50 has three buffered output signals and five input control signals as well as parallel-to-serial and serial-to-parallel conversion circuitry. The "modem" controller 50 is a commercially available unit associated with the Alpha 16 Computer previously identified.

Communication between a remote station and the regional computer is conducted over polled multi-point, multi-drop leased telephone lines 56 connected to the modem 52. The system employs asynchronous transmission in half duplex using the ASCII code.

Referring to FIG. 4, there is shown a typical communication network wherein the central controller 38 (at a remote station identified with the dotted line 54) connects through output lines to the modem 52 having terminals coupled to the dedicated telephone line 56. Typically, the modem 52 transmits 300 bits per second of information to a concentrator 58 through a modem 60. The concentrator 58 receives data from a separate remote station on each of the input lines 62. Concentrators of the type that may be used in the present system are available from Honeywell Inc. and identified as a Honeywell 316 Concentrator. Other concentrator circuitry may be utilized. Functionally, the concentrator 58 converts the relatively slow bit transfer rate from the modem 52 to a high speed bit transfer rate to the regional (or national) computer 64. Data bits from the concentrator 58 are coupled through a modem 66 to a dedicated telephone line 68 and through another modem 70 to the regional computer 64. Using the example of 300 bits per second as a transfer rate from the modem 52, the concentrator provides a 4800 bit per second transfer rate to the regional computer 64.

Typically, the regional (or national) computer 64 is a properly programmed Univac 494 computer.

Figure 5:
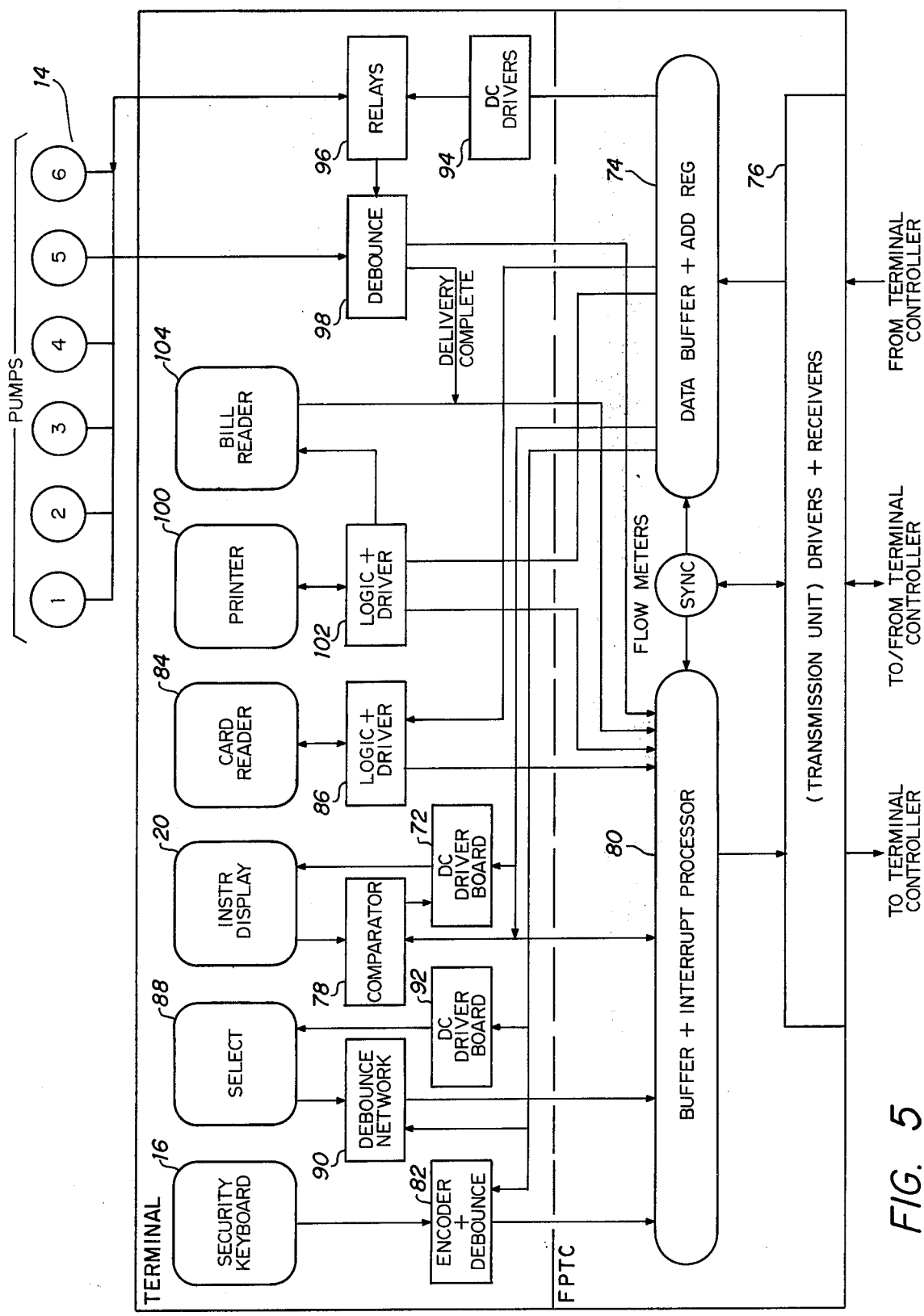
FIG. 5 is a block diagram of a terminal console for a fuel dispensing island such as shown in FIG. 1.

Referring to FIG. 5, the display 20 presents message No. 1 of Table I to a customer to insert his credit card into the card gate 18 or a dollar bill into the currency gate 30. The instruction display 20 receives energizing signals through a driving circuit 72 from a comparator 78. The comparator 78 compares position data from the display 20 with position data from the computer 42 through a data buffer 74 and a transmission unit 76. The display 20 remains energized and rotates until the position data from the display 20 agrees with the position data from the computer 42, at which time the display 20 stops at the particular display message desired. This is the first in a sequence of step by step operating instructions leading to a completed transaction.

Considering only credit card operation, after the user has inserted his credit card a second instruction message (message No. 2 of Table I) appears in the display 20 to instruct a user to key in his identification code through the security keyboard 16. The security keyboard 16 is also coupled to the computer 42 through an encoder 82, the buffer 80 and the transmission unit 76. Keying in the user's identification code requires that the customer's personal identification number be entered by means of the numbered push button keys of the keyboard 16. By operation of the computer 42, in conjunction with the memory 48, the keyed-in number is verified with verification data read from the inserted credit card by a card reader 84. Verification data generated by the card reader 84 is coupled to the computer 42 through logic and driver circuitry 86, the buffer 80 and the transmission unit 76. To verify a credit card with a keyed-in identification code, the computer 42 compares the data from the card reader 84 with the security keyboard generated data. A favorable comparison verifies that the user has an authentic card and the sequence continues. As an alternate, the security keyboard 16 is eliminated and verification data from the card reader 84 is utilized in a verification routine along with data stored in the memory 48. The same verification process is completed in either operation.

In either case, when a verification code cannot be generated by the computer 42, indicating that the computer cannot authenticate the presented credit card, message No. 3 of Table I is displayed in the instruction display 20 and the credit card is returned to the user and the transaction completed. Alternatively, if a verification code cannot be generated by the computer 42, the user is instructed through the display 20 to again insert his identification code for a second verification sequence. The verification sequence is then repeated and if a verification code again cannot be generated, the user is instructed to again insert his identification code. Upon the third insertion of an identification code and a failure to generate a verification code, the card reader 84 captures the credit card. In this situation, message No. 5 of Table I is presented at the display 20.

Following the generation of a verification code, the computer 42 generates an authorization request message for transmission to the regional computer 64. The regional computer 64 checks the account as read from the credit card and if the account is not delinquent or otherwise flagged as a questionable risk, an authorization message is generated by the regional computer for transmission to the central controller 38 of the remote station originally forwarding the authorization request message.

Upon receipt of an authorization message at the controller 38, message No. 4 of Table I is presented at the display 20 instructing a user to operate one of the push button keys 22 of the pump select keyboard 88. The selected pump signal is connected through a debounce network 90, through the buffer 80 and the transmission unit 76 to the computer 42. The computer 42 in turn sends a message through the data buffer 74 and driver circuitry 92 to set the status indicator 24 to the "in use" message. At this time, message No. 7 of Table I is presented at the display 20 instructing a user to go to the selected pump and dispense the fuel desired. The pumps are activated by the computer 42 through the data buffer 74 and a driver network 94 controlling a relay array 96 for energizing the selected pump 14.

During delivery of fuel from the selected pump, a flow meter attendant with each pump generates quantity pulse signals coupled through a debounce network 98 to the computer 42 through the buffer 80. These delivered fuel pulse signals are utilized in the computer 42 to compose a message for transmission to the regional computer 64 for recording the dollar value of fuel dispensed to the account associated with a presented card.

Upon completion of delivery of fuel from the pump 14, the computer 42 activates the printer 100 for printing a receipt to be delivered through the receipt throat 32 to the user. The printer 100 is connected to the computer 42 through driver logic 102. Upon completion of the print sequence, the computer 42 sends an instruction to the pump select keyboard 88 to return the indicator 24 to the "now available" message.

When utilizing currency for activating the system, bills inserted through the currency gate 30 are read by the bill reader 104 that generates closure signals coupled to the computer 42 through the buffer 80 and the transmission unit 76.

After a user has inserted his first dollar bill, message No. 9 of Table I is presented at the display 20 instructing the user to insert as many one dollar bills as desired. After he has inserted the last bill, he activates one of the push button keys 22 of the pump select keyboard 88 and the system operates as previously described with the modification that the computer 42 continually monitors the fuel dispensed to deenergize the pump 14 at the value of the bills inserted.

The buffers 74 and 80 and the transmission unit 76 comprise a format, priority and transmission controller (FPTC) as a logic interface between the terminal console 12 and the local computer 42. The FPTC provides the necessary circuitry for control of the peripherals of the computer 42 and data to the computer from the peripherals in response to a computer inquiry. Data may be also generated to the computer 42 from one of the peripherals, such as the pump select keyboard 88 or the card reader 84, as a result of outside stimuli. The format logic processes the data from the peripherals into an eight-bit data byte, and an eight-bit address byte which precedes the data byte as an identification of the source of the data or status information. No data may be transmitted either to or from the computer 42 without permission thereof. Therefore, an attention line is used to inform the computer that a peripheral is in a state to send data or a status to the computer. The attention priority line provides a sequence that allows a higher priority device (the peripheral) to send data before a lower priority device. Subsequent to a data transmission, the computer resets the line and permits selection of the next highest priority.

Figure 6:
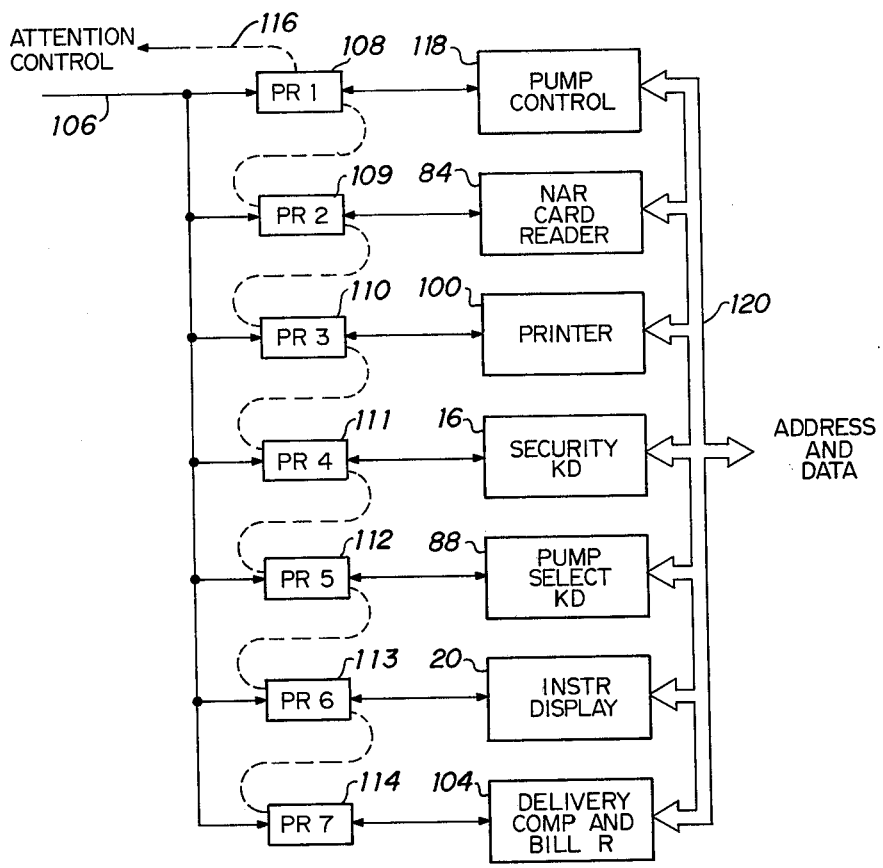
FIG. 6 is a flow chart showing the priority sequencing for operation of the automated dispensing system in accordance with the present invention.

Referring to FIG. 6, there is shown the priority sequence for data transmission to the computer 42. The priority selection logic circuits 108–114 are individually associated with one of the peripherals and are polled continuously by the FPTC until one or more of the peripherals requests attention of the computer 42 on an attention line 116. The computer 42 responds on the control line 106 thereby stopping the poll and enabling the peripheral having the highest priority to transmit data or status to the computer 42. First in priority is the pump control 118 which will be described subsequently. If data is to be transmitted to or from the pump control 118 it receives first priority over other terminal console peripherals. Second in priority is the card reader 84 connected to the priority logic 109. The priority sequence then includes the printer 100 connected to the priority logic 110, the security keyboard 16 connected to the priority logic 111, the pump select keyboard 88, connected to the priority logic 112, the instruction display 20 connected to the priority logic 113, and the bill reader 104 connected to the priority logic 114. Data from the peripherals to the computer 42 is transmitted over data lines 120.

The transmission unit 76 consists of differential drivers and receivers used by the FPTC to reliably transmit and receive signals to and from the computer 42.

Figure 7:
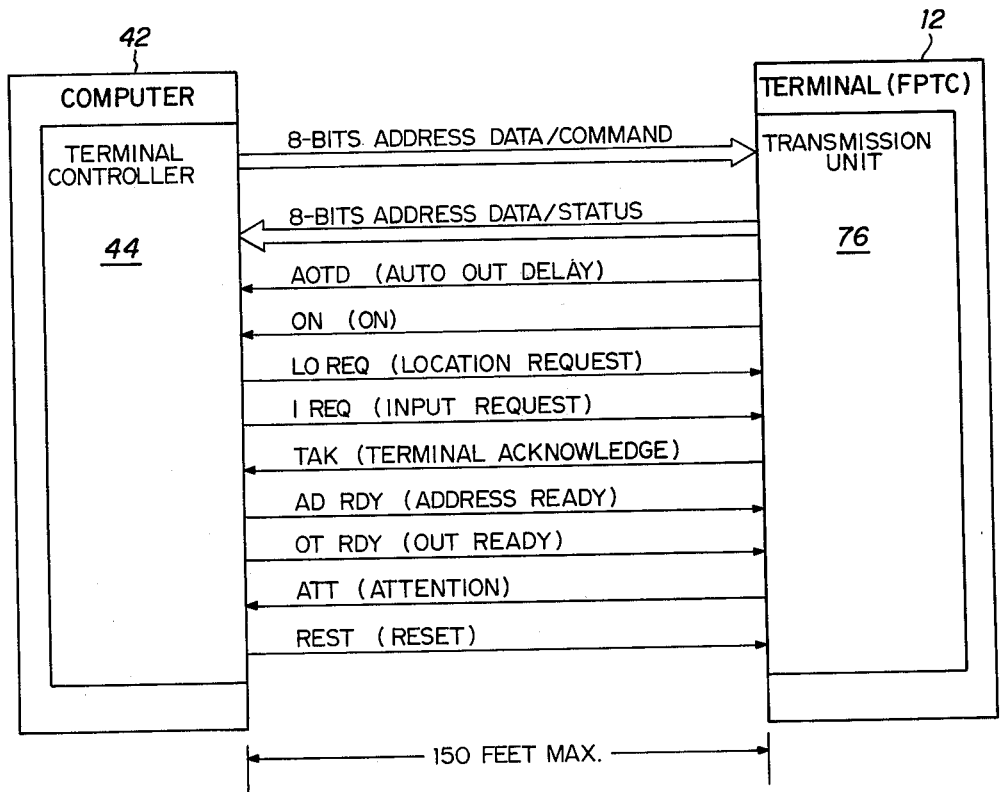
FIG. 7 shows a typical data flow pattern between a terminal console and a remote station computer.

Referring to FIG. 7, there is shown a typical data flow sequence from the computer 42 through the terminal controller 44 to the terminal console 12 through the transmission unit 76. Address data command bits flow from the computer 42 to the terminal console 12 and direct data status bits flow from the terminal 12 to the computer 42. Instructions AOTD and ON along with TAK and ATT are transmitted from the terminal 12 to the computer 42. In the reverse direction, request instructions and ready instructions along with a reset are transmitted from the computer 42 to the terminal 12. Other instructions and data bits may be transmitted between terminal 12 and computer 42 when required by a particular fuel dispensing system.

Figure 8:
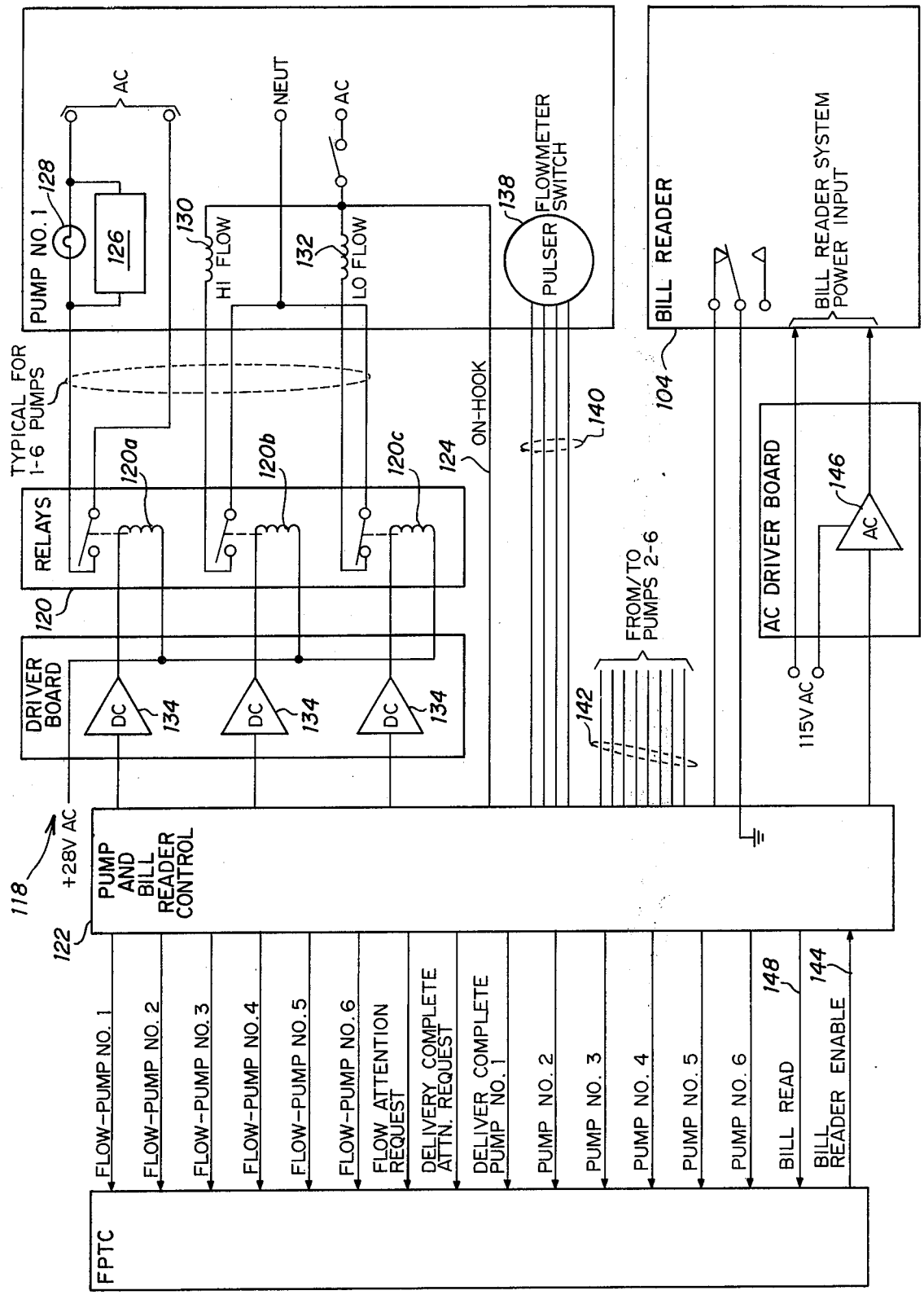
FIG. 8 is a block diagram of a pump controller for one of the six pumps of the island of FIG. 1 and including a flow meter monitor.

Referring to FIG. 8, there is shown the pump controller 118 interconnected to the bill reader 104. Only the controls for pump 1 are shown in detail with the controls for pumps 2–6 being similar to that shown. Basically, the pump controller is an interface unit consisting of relays 120 for activating the pump 14 (including displays associated therewith). Additional relays within a controller 122 are activated by the pump handle to indicate delivery is complete. The relay from pump No. 1 is activated by a closure signal on a line 124.

Within the relay network 120, relay 120-a is energized to activate the flasher 126 and an indicator light 128. Relays 120-b and 120-c are used for high flow and low flow rate valves, respectively, to vary the pumping rate. Specifically, the relay 120-b controls a solenoid winding 130 for the high rate flow valve and the relay 120-c controls a solenoid winding 132 for the low flow rate valve. Each of the relays 120 is individually controlled by the output of a driver amplifier 134 within the network 96. To monitor the amount of fuel distributed by a particular pump, each is equipped with a flow meter 138 generating pulse rate signals on lines 140 to the computer 42 through the FPTC logic. As mentioned, each of the other pumps 2–6 is also connected to the FPTC logic through the relays 122 over lines 142.

Associated with the pump controller is the bill reader 104 that is enabled by an instruction on a line 144 to activate an amplifier 146 to drive the bill reader 104. The signals indicating the acceptance of a dollar bill submitted to the reader 104 are transmitted over a line 148 to the FPTC logic.

SYSTEM OPERATION

Referring to FIGS. 9–18, the operating sequence of the dispensing system of the present invention will now be described. After placing the system in an operation mode, a program initialization step 150 is completed and message No. 1 of Table I is displayed during a step 152. Following the initialization step the bill reader 104 and the card reader 84 are enabled at operation 154.

Three types of customer transactions are possible with the dispensing system including a credit card transaction, a cash (dollar bill) transaction and a cash card transaction. When a customer inserts a credit card into the card gate 18 an inquiry 156 provides a positive response and the card reader and bill reader are disabled during an operation 158. Next, the sequence advances to inquiry 160 to evaluate data read from the inserted credit card. If for some reason the data cannot be read from the inserted credit card, inquiry 160 advances the sequence to inquiry 162 which produces a negative response on the first and second reading of the card. The card is then released at step 164 and message No. 6 of Table I is presented at the instruction display 20 as at step 166. When the card is removed from the throat 28, the sequence returns to the display 152 and the enable operation 154.

A positive response to the inquiry 162 indicates that three attempts have been made to read the inserted card and the sequence advances to a release card operation 168 of FIG. 15. At this time, message No. 3 of Table I is presented at the display 20 as at step 170. An error subroutine is now entered to establish the sequence for printing a receipt to the customer with an error code indicating that his card cannot be read. Following the subroutine 172, the message No. 5 of Table I is presented in the display 20 at step 174. The terminal console 12 then returns to the ready state during operation 176 and a receipt is printed during operation 178 for return to the customer through the receipt throat 32. The sequence then returns to operation 154 with the message No. 1 of Table I presented at the display 20.

A negative response to the inquiry 160, indicating that data has been read from the credit card, advances the sequence to an operation 180 having as a subroutine thereto a validity check 182. During the card validity check 182, data from the card is transferred to the computer 42 where a check digit is evaluated. If the check digit is valid, the authorization sequence begins. If the check digit is incorrect, the computer 42 causes message No. 3 of Table I to be presented in the display 20. For an incorrect check digit, the sequence of FIG. 15 is then completed.

For an invalid card, the sequence of FIG. 14 is implemented with message No. 3 displayed at step 184. The card is released during operation 186 and message No. 8 of Table I is presented at the display 20 in a step 188. A five second time-out is started at the step 190 and inquiry 192 is completed to determine when the five second time-out has elapsed. Completion of the five second time-out advances the sequence to operation 194 wherein the terminal console 12 is readied for the next transaction and the sequence returns to the step 152 and operation 154.

During the card verification sequence, a customer also enters his personal identification code by means of the security keyboard 16 and this data is compared with a security identification code, derived from the number on the inserted credit card. An alternate verification routine is described in the U.S. Pat. No. 3,662,343 issued in the name of Kenneth S. Goldstein et al. and entitled Credit Card Automatic Currency Dispenser.

When the verification routine provides a valid card indication, the system operation proceeds from operation 180 to sequence 196 of FIG. 11. At the same time, message No. 3 of Table I is presented in the display 20 as at step 198. In the authorization sequence 196, the computer 42 sets up an authorization request data message and waits for a poll from the concentrator 58, which in turn sends a message to the regional (or national) computer 64.

Immediately upon completion of the setting up of the authorization request data message, the computer 42 sets a ten second time-out during which an "authorization-to-send" poll must be received at the central controller 38. If a poll is not received during that time, a local authorization message is generated by the computer 42 and the sequence advances to the inquiry 200. If a poll is received and the authorization request data message sent from the terminal to the regional computer 64, the computer 42 sets up a fifteen second time-out as a waiting period for receiving a credit okay authorization message from the computer 64. Alternatively, the message received from the computer 64 may be a request to repeat the authorization request data message. Up to two such requests may be received by the computer 42, after which further transmission is terminated and local authorization granted by the computer 42 with the sequence advancing to the inquiry 200. Upon receipt of a credit okay authorization message or a non-credit authorization message from the regional computer 64, the sequence also advances to the inquiry 200.

The receipt of a non-credit authorization message produces a negative response to the inquiry 200 and the sequence of FIG. 11 advances to the inquiry 204. If the credit card is to be captured, the sequence advances to capture operation 206 and from 206 to an error code subroutine 210. A negative response to the inquiry 204, indicating the card is not to be captured, increments the sequence to the release card operation 208 and then to the error code routine 210. Upon completion of the error code routine 210, a print routine 212 is then entered and the message No. 5 of Table I presented at the display as at step 214. Completion of the print routine 212 recycles the system to operation 154 and display step 152.

Figure 16:
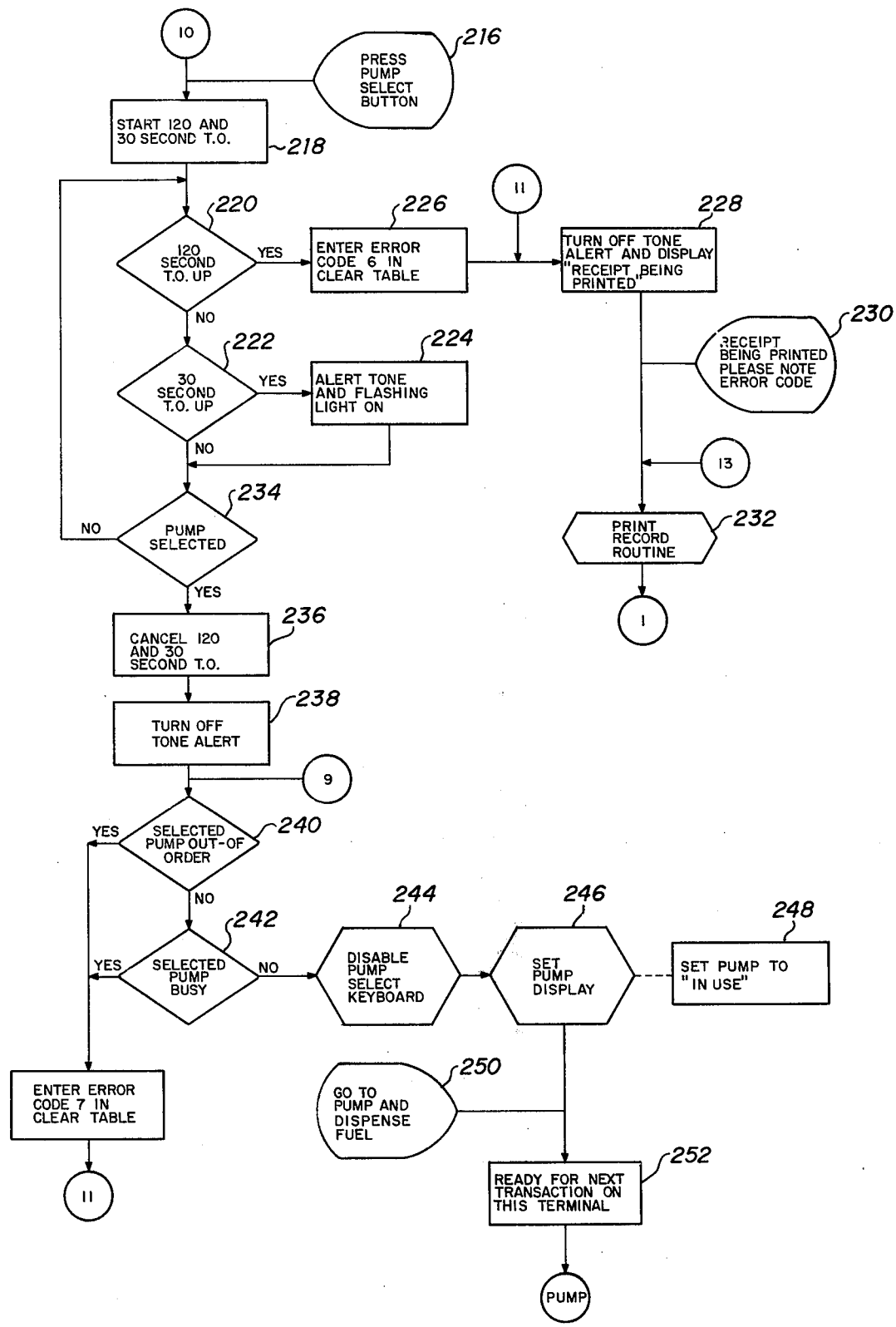
FIG. 16 is an operational flow chart of a sequence of the system for selecting a particular pump for dispensing of a desired amount of fuel.

Any time an authorization credit message is generated either from the regional computer 64 or the local computer 42, the inquiry 200 produces a positive response and the system advances through the release operation 202 to release the credit card to the customer and then advances to the pump select sequence of FIG. 16. Upon entering the pump select sequence, message No. 4 of Table I is presented in the display 20 at step 216 and two time-out periods are started during a time-out operation 218. Time-out inquiries 220 and 222 are then repeated until a pump is selected. If a pump is not selected within 30 seconds, the inquiry 222 produces a positive response advancing the sequence to a light flashing operation 224 thereby activating the display 20 into a flashing mode and also energizing the audio alarm located on the console panel at the grill 34. At the end of 120 seconds, if a pump has not been selected, the inquiry 220 provides a positive response to advance the sequence to the error code subroutine 226. The transaction is terminated with message No. 5 of Table I presented in the display 20.

Before the 120 second time-out has expired, operation 224 will have been initiated and the subroutine 228 turns off the audio alarm and causes the display of message No. 5 at step 230.

As the sequence circulates through the inquiries 220 and 222, an inquiry 234 is made to determine if a pump has been selected. When the customer has selected a particular pump the inquiry 234 provides a positive response and the sequence advances to a cancel time-out operation 236 and then to a step 238 for turning off the audio alarm. Next, the sequence proceeds through inquiries 240 and 242 to evaluate if the selected pump is operational (inquiry 240) or if the selected pump is busy (inquiry 242). With a positive response to either of these inquiries the system proceeds to the operation 228 and message No. 5 is presented at the display 20 in step 230.

Following the subroutine 228, the sequence advances to a print record routine 232 to generate a receipt to the customer indicating the reason for the termination of the transaction. The sequence then returns to the operation 154 and message No. 1 of Table I is displayed at step 152.

A negative response to both the inquiries 240 and 242 advances the sequence to a pump disable operation 244 to deactivate the pump select keyboard 88 and following the disable operation 244 proceed to a pump display step 246. In the pump display step 246 an "in use" display is presented at the status indicator 24. Next, message No. 7 of Table I is presented in the display 20 at a step 250 and the step 252 is completed to return the terminal console 12 to the initialization step.

Figure 17:
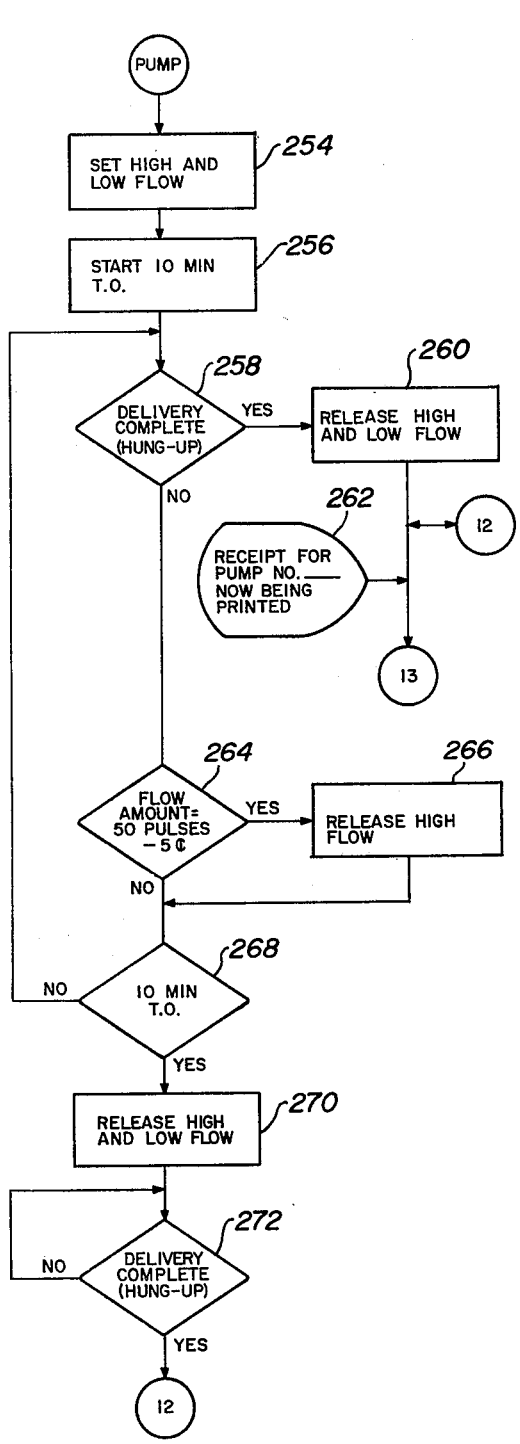
FIG. 17 is a flow chart showing the system sequence for dispensing fuel.

Referring to FIG. 17, on completion of the pump select sequence, the system advances to the fuel dispensing sequence commencing with the setting operation 254 to activate the relays of network 96 to turn on the high and low flow rate valves for dispensing of fuel by a customer. With the "go to pump and dispense fuel" message displayed, and the pump enabled, the central controller 38 sets up the selected pump, sets protective time-outs, and monitors fuel flow pulses. If the transaction is from a credit card, fuel is dispensed at a high rate until the pump nozzle trigger is released. If a cash transaction, the central controller 38 sets the fuel flow at a high rate until about fifty flow pulses prior to reaching the cash limit. At the fifty flow pulse limit, the fuel flow is reduced to a lower rate until the pump shuts off automatically when the cash limit is reached.

Following the enabling of the high and low flow rate valves set in operation 254, a ten minute time-out is set in step 256. This time-out is set to assure that the customer completes the dispensing of the desired fuel within a preset limit period. If this amount of time is exceeded, the transaction is terminated as though the customer replaced the pump nozzle in its stowed position. Also, as a protective feature, a maximum dollar limit will be allowed before terminating the transaction.

After setting the ten minute time-out at operation 256, the dispensing sequence proceeds to inquiry 258 which determines if the customer has completed his transaction by returning the pump nozzle to a stowed position. A "yes" response to the inquiry 258 advances the sequence to a release operation 260 which releases the high and low flow rate valves. Following the operation 260, one of the messages Nos. 10–15 will be presented at the display 20, depending on the pump selected. At this time, the sequence returns to routine 232, the print record routine, of FIG. 16.

A negative response to the inquiry 258, indicating that delivery of fuel has not been completed, advances the sequence to an inquiry 264 which evaluates when, during a cash transaction, the fifty flow pulse to completion limit is met. A positive response to the inquiry 264, indicating that the pulse limit has been reached, advances the sequence to a release operation 266 to change from the high flow rate to the low flow rate for the remainder of the fifty pulses. Upon completion of operation 266 or a negative response to inquiry 264, the sequence advances to inquiry 268 for evaluating the ten minute time-out set by the operation 256. A negative response to the inquiry 268 returns the sequence to the inquiry 258. A positive response initiates a release operation 270 to release the high and low flow rate relays 120-*b* and 120-*c*. Following the operation 270, the inquiry 272 is recirculated until a positive response advances the sequence to the display step 262.

If the transaction just completed was initiated by a credit card, billing data is transmitted to the regional computer 64 and automatically entered on a customer's account. This is completed by the computer 42 first generating a billing message that includes a poll code, a terminal code, the credit card number, the station identification code, the company code, a dollar amount, amount of fuel dispensed, type of fuel dispensed and an invoice number. In addition, tax data, unit price information and an end-of-transmission code is included in the billing message. A billing message is transmitted from the computer 42 to the regional computer 64 by the same polling sequence that was used for authorization requests.

A typical authorization or billing message sequence for transmitting to the regional computer 64 or receiving from the regional computer commences by the concentrator 58 polling each of the output lines 62. When a remote station has a message prepared to be transmitted to the regional computer 64, that station recognizes the poll of concentrator 58 and places the message on the line 56. The concentrator 58 stops polling and the terminal transmits the authorization or billing message and sets a fifteen second timer. The remote station waits for a response from the concentrator 58 while the concentrator sends the message to the regional computer 64 and takes the terminal off the polling schedule and resumes polling.

All the remote stations continually scan the messages from the concentrator 58 until recognizing an identifying signature and message. The remote station then accepts the message and the concentrator 58 returns the terminal to the polling schedule. That is, after a remote station has transmitted either an authorization request or billing message to the regional computer 64, it is removed from the polling sequence. If a terminal has not received a message within fifteen seconds after transmitting an authorization request message, the transaction is authorized locally by the local computer 42, as explained:

In response to an authorization request message from a remote station, the regional computer, through the concentrator 58, transmits to the inquiring station, one of six messages. One of these messages is a credit okay authorization which is transmitted upon satisfying certain criteria for operating the dispensing system. A second message "unauthorized user" is transmitted in the situation where a credit card has been lost or stolen and the user does not have rightful authorization to use the card. Another message "retransmit" is taken by the local computer 42 as a signal to give local authorization for the use of a presented credit card. A fourth message "do not honor" is transmitted by the computer 64 under circumstances such as excessive credit showing on a particular account. Also in the case of bad payment record, the "do not honor" message is transmitted from the regional computer 64 to the local computer 42. Still another message transmitted from the computer 64 to an inquiring remote station is the "pick-up card" code transmitted when a particular card has, for example, expired. This message may also be transmitted for an extremely poor payment record or excessive credit charges. One final message is an instruction to call the regional computer facility for detailed instructions.

In response to transmission of a billing message from a remote station, the regional computer 64 generates either a "successful receipt of billing data" message or a "retransmit" message.

When an authorization request message has been transmitted to the regional computer 64, the inquiring remote station will activate the fuel dispensing sequence upon receipt of messages 1, 3 (repeated three times), and 6 in addition to expiration of the fifteen second time-out and an incorrect authorization response. In the case of a billing message being transmitted from a remote station to the regional computer 64, when a retransmit message has been sent to the concentrator 58, the billing message will be retransmitted to the regional computer.

Figure 18:
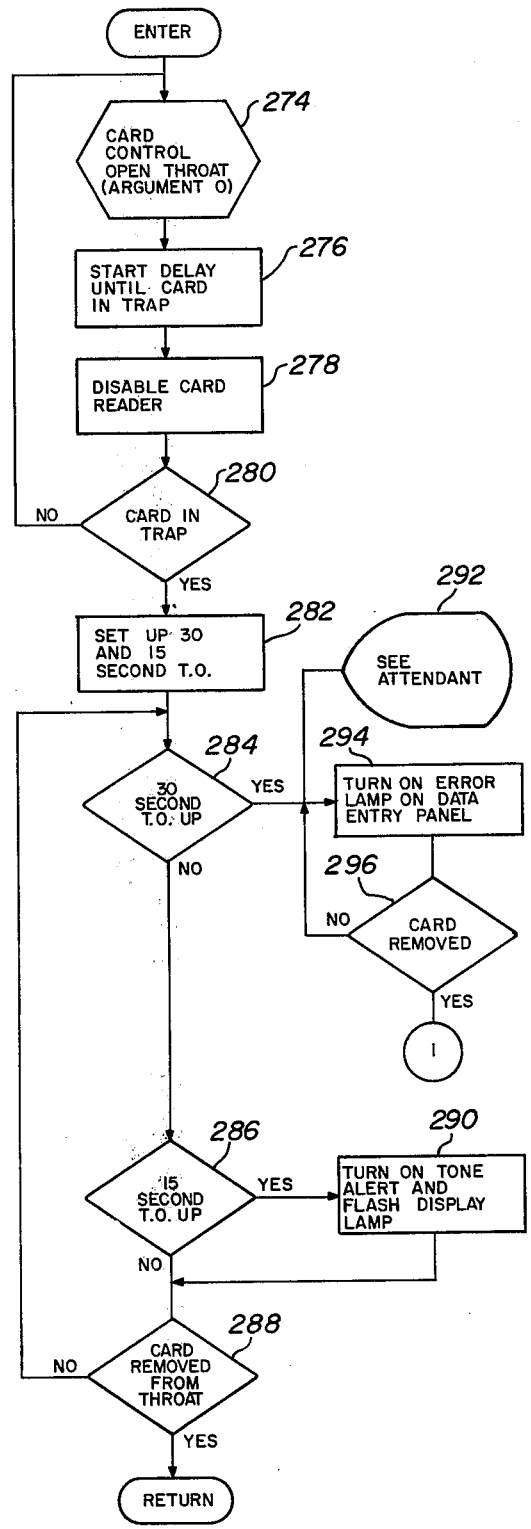
FIG. 18 is an operational flow chart showing the system sequence for releasing a credit document following verification and authorization of a dispensing transaction.

Referring to FIG. 18, whenever in the various subroutines a release card subroutine is entered the system enters this routine at an open card throat operation 274 that opens the card throat gate 28 followed by a time delay initialization step 276. After setting up a time delay at step 276, the card reader 84 is disabled in a disable operation 278 and an inquiry 280 is made to determine if the card has been transmitted to the throat 28. When the card has been delivered to the throat 28, the release card routine sets up thirty and fifteen second time-outs in a time-out 282. Two time-out inquiries 284 and 286 are then recirculated until a "yes" response results from either, or the card is removed from the throat 28 resulting in a positive response from the inquiry 288.

If the card is not picked up within fifteen seconds by a customer, the inquiry 286 produces a positive response initiating a flashing display operation 290, causing the display 20 to be activated into a flashing mode and energizing audio alarm 34. After an additional fifteen seconds, the inquiry 284 produces a positive response and the display 20 is changed to "see attendant" as at a display step 292. The error lamp operation 294 is also implemented upon a positive response to the inquiry 284 to turn on an error lamp on the data entry panel. This sets up the inquiry 296 which recirculates until the card has been removed from the throat 28. Removing a card from the throat 28 causes the routine to return to the initialization step of FIG. 9.

In addition to credit card actuation of the system, it is also implemented to be activated by dollar bills inserted into the currency gate 30. When a customer, in response to the instruction of the display 152 of FIG. 9, inserts a dollar bill, the inquiry 156 produces a negative response to advance the sequence to card reader disable operation 298 to disable the card reader 84 and advance the sequence to the routine of FIG. 10.

Initially, message No. 9 of Table I is presented at the display 20 as at the display step 300. Up to ten one dollar bills will be accepted by the system, each within a thirty second time-out as established by time-out step 302. Following initiation of the time-out, the inquiries 304, 305 and 308 are made to determine first if another bill is presented, next if a pump has been selected, and third if the thirty second time-out has expired. If the thirty second time-out has not expired, the sequence recirculates through the inquiries 304 and 306. When the time-out has expired without a positive response to either inquiry 304 or 306, the sequence advances to a disable bill reader operation 310 and then to the time-out 218 of the pump select sequence.

Each time a dollar bill is entered through the currency gate 30, inquiry 304 results in a positive response and the system advances to the inquiry 312. The inquiry 312 determines if the ten dollar limit has been reached and if not, recirculates the dollar bill sequence to the step 302. If ten dollars has been inserted into the terminal console 12, a positive response results from the inquiry 312 and the sequence advances to the disable bill reader operation 310.

When the sequence produces a positive response to the inquiry 306, indicating that a customer has inserted all the dollar bills he desires, and has selected a pump, the sequence advances to a disable bill reader operation 314. Following the operation 314, the sequence advances to inquiry 240 of the pump select sequence of FIG. 16. Either in response to the operation 310 or the operation 314, the cash sequence of the system proceeds as previously described with regard to credit card dispensing.

In the cash transaction operation of the system, when a user has inserted dollar bills greater in value than the amount of gasoline dispensed, the print receipt sequence prints a refund receipt for use by the customer to obtain a cash refund from an attendant.

A third mode of operation of the system of the present invention is the use of a cash card, that is, a credit card having a fixed cash value. When such a cash card has been entered into the system in response to the message of step 152, the sequence advances through the routines of FIG. 9 and from the step 180 to the routine 316 of FIG. 12. In the routine 316, the value of the card is entered in the computer 42 and the sequence advances to the operation 318 to capture the cash card and not allow its return to the user. After capturing the cash card, the sequence advances to the time-out 218 of the pump select sequence of FIG. 16 and the system proceeds through the pump select sequence and the fuel dispense sequence of FIG. 17 as in a currency transaction.

Figure 9:
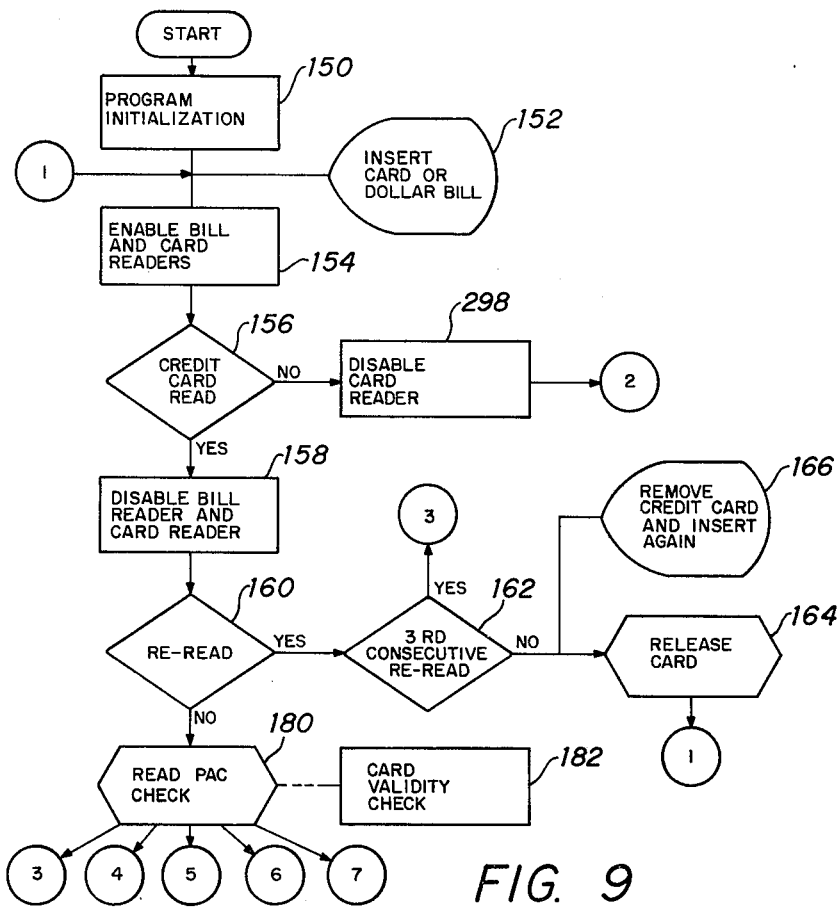
FIG. 9 is an operational flow chart of the dispensing system showing the initial card reading sequence.
Figure 10:
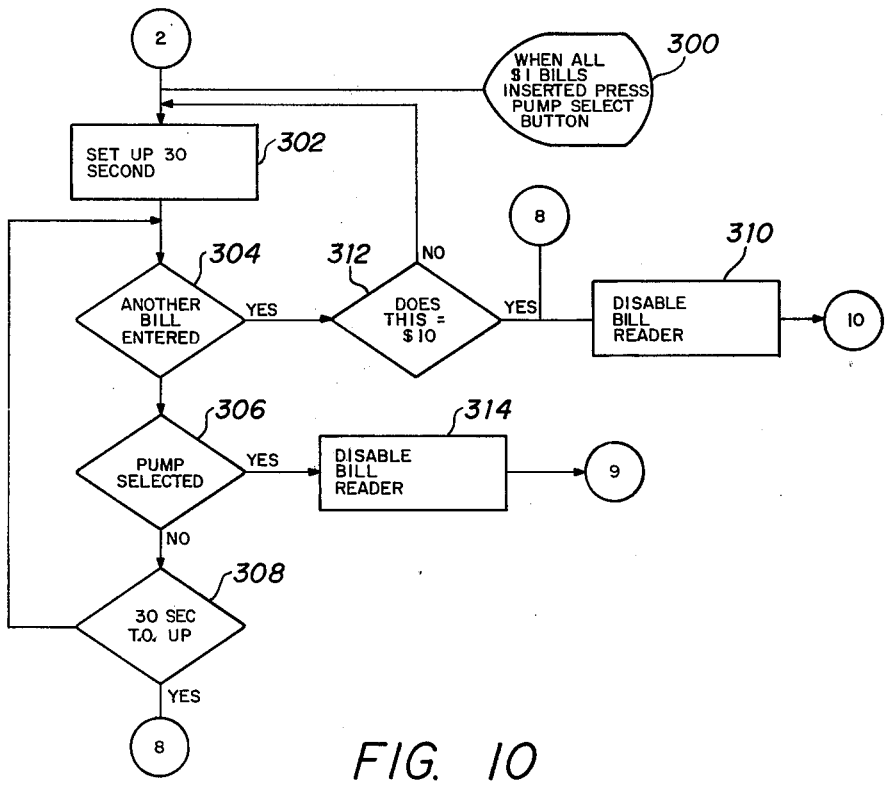
FIG. 10 is an operational flow chart showing the system sequencing for currency control.

Whenever the program initialization sequence of FIG. 9 proceeds through the operation 180 and the presented card is not honored due to having expired, message No. 3 of Table I is presented at the display 20 as during step 322 of FIG. 13. The release card operation 320 is entered followed by the subroutine 324. At this time, message No. 5 of Table I is presented at the display 20 during a display step 328. Following the ready for next transaction operation 326, the print record subroutine 330 is entered and the system returns to step 154 of FIG. 9.

While only one embodiment of the invention, together with modifications thereof, has been described in detail herein and shown in the accompanying drawings, it will be evident that various further modifications are possible without departing from the scope of the invention.

What is claimed is:

1. An automatic document controlled dispensing system with remote stations and a communication connection with a regional computer, comprising in combination:
   reading means at a remote station for reading verification data from a credit document inserted into a terminal console,
   verification means at the remote station coupled to said reading means and receiving therefrom the verification data from the terminal console and verifying the authenticity of an inserted credit document,
   means responsive to the verification of a document for setting up an authorization request message for an authenticated document,
   means for transmitting the authorization request message to the regional computer and for transmitting a credit authorization message or a refuse credit authorization message from the regional computer to a selected remote station, and
   means for dispensing an article selected in response to the credit authorization message.

2. An automatic document controlled dispensing system as set forth in claim 1 wherein said verification means includes:
   first means for storing a verification code inserted into the machine, and
   second means interconnected through said first means for comparing verification data read from the presented document with the stored verification code for verification of the validity of the presented document.

3. An automatic document controlled dispensing system as set forth in claim 1 including means for polling each of the remote stations in sequence to ascertain the condition thereof to transmit an authorization request message to the regional computer.

4. An automatic document controlled dispensing system with remote stations and a communication connection with a regional computer, comprising in combination:
   reading means at a remote station for reading verification data from a credit document inserted into a terminal console,
   verification means at the remote station coupled to said reading means and receiving therefrom the verification data from the terminal console and verifying the authenticity of an inserted credit document,
   means responsive to the verification of a document for setting up an authorization request message for an authenticated document, means for transmitting the authorization request message to the regional computer and transmitting a credit authorization message or a refuse credit authorization message from the regional computer to a selected remote station, means for dispensing an article selected in response to the credit authorization message, and means for printing a receipt at the terminal console identifying the value of a dispensed article.

5. An automatic document controlled dispensing system as set forth in claim 4 including means at a remote station for transmitting a dispensed article value message to the regional computer.

6. An automatic document controlled dispensing system as set forth in claim 4 wherein said verification means includes means for establishing a maximum time period for transmission of the authorization request message to the regional computer.

7. An automatic document controlled dispensing system as set forth in claim 6 wherein said verification means includes means actuated at the end of the time period when the request message has not been transmitted to generate a credit authorization message at the remote station.

8. An automatic document controlled dispensing system as set forth in claim 4 including means for selecting an article to be dispensed in response to the credit authorization message.

9. An automatic document controlled dispensing system with remote stations and a communication connection with a regional computer, comprising in combination:

reading means at a remote station for reading verification data from a credit document inserted into a terminal console, verification means at the remote station coupled to said reading means and receiving therefrom the verification data from the terminal console and verifying the authenticity of an inserted credit document, means responsive to the verification of a document for setting up an authorization request message for an authenticated document, means for transmitting the authorization request message to the regional computer and transmitting a credit authorization message from the regional computer to a selected remote station, means for dispensing an article selected in response to the credit authorization message, means at the terminal console for receiving currency and generating a currency closure signal, and means responsive to the current closure signal to generate a currency total signal and actuate said means for dispensing.

10. An automatic document controlled dispensing system as set forth in claim 9 including means for generating a currency refund receipt when the currency total signal exceeds the value of the dispensed article.

11. An automatic document controlled dispensing system with remote stations and a communication connection with a regional computer, comprising in combination:

reading means at a remote station for reading verification data from a credit document inserted into a terminal console, verification means at the remote station coupled to said reading means and receiving therefrom the verification data from the terminal console and verifying the authenticity of an inserted credit document, means responsive to the verification of a document for setting up an authorization request message for an authenticated document, means for transmitting the authorization request message to the regional computer and transmitting a credit authorization message from the regional computer to a selected remote station, means for dispensing an article selected in response to the credit authorization message, means for receiving a fixed value credit document and generating a value signal therefor, and means responsive to the value signal to actuate said means for dispensing.

12. An automatic document controlled dispensing system as set forth in claim 11 including means for generating a value refund receipt when the value signal exceeds the value of the dispensed article.

13. An automatic credit card controlled fuel dispensing system with remote stations and a communication connection with a regional computer, comprising in combination:

a card reader at terminal console for a remote station, the card reader responsive to verification data on a credit card and providing a verification data signal, verification means at the remote station coupled to said card reader and receiving therefrom the verification data signal from the terminal console and verifying the authenticity of an inserted credit card, means responsive to the verification of a credit card for setting up an authorization request message for an authenticated credit card, means for transmitting the authorization message to the regional computer and transmitting a credit authorization message from the regional computer to a selected remote station, a plurality of fuel dispensing terminals connected in sets to one terminal console at a remote station and controlled therefrom, and means at said terminal console for selecting one of the fuel dispensing terminals for dispensing of a quantity of fuel in response to a credit authorization message.

14. An automatic credit card controlled fuel dispensing system as set forth in claim 13 including means at each terminal console for printing a receipt of a fuel dispensing transaction including the value thereof.

15. An automatic credit card controlled fuel dispensing system as set forth in claim 13 including a currency reader at the terminal console for receiving currency and generating a currency closure signal, and means responsive to the currency closure signal to generate a currency total signal and actuate a selected fuel dispensing terminal.

16. An automatic credit card controlled fuel dispensing system as set forth in claim 15 including means for generating a currency refund receipt when the currency total signal exceeds the value of fuel dispensed from a dispensing terminal.

17. An automatic credit card controlled fuel dispensing system as set forth in claim 13 wherein said card reader includes means for receiving a fixed value credit card and for generating a value signal therefor, and means responsive to the value signal to actuate a selected fuel dispensing terminal.

18. An automatic credit card controlled fuel dispensing system as set forth in claim 17 including means for generating a refund receipt when the value signal exceeds the value of fuel dispensed from a terminal in a dispensing transaction.

19. In an automatic document controlled dispensing system with remote stations and a communication connection with a regional computer, the method comprising the steps of:
 verifying the authenticity of a credit document inserted into said system at a terminal console,
 setting up an authorization request message for transmission to the regional computer in response to the verification of a credit document,
 transmitting the authorization request message to the regional computer upon a verification of the authenticity of the inserted credit document,
 transmitting a credit authorization message or a refuse credit message from the regional computer to a selected remote station in response to an authorization request message,
 monitoring the value of a selected article dispensed from the system in response to a credit authorization message and generating a monitored value message, and
 transmitting the monitored value message to the regional computer for recording therein.

20. In an automatic document controlled dispensing system as set forth in claim 19 including the step of generating a receipt at the terminal console identifying the value of an article selected and dispensed.

21. In an automatic document controlled dispensing system as set forth in claim 19 including the step of setting up a monitored value message for transmission to the regional computer.

22. In an automatic document controlled dispensing system as set forth in claim 19 including the step of polling each of the remote stations in sequence to transmit an authorization request message to the central computer.

23. In an automatic document controlled dispensing system as set forth in claim 22 including the step of establishing a maximum time period for receipt of a polling of a remote station and the transmission of the authorization request message to the regional computer.

24. In an automatic document controlled dispensing system as set forth in claim 23 including the step of generating a credit authorization message at the remote station at the expiration of the maximum time period and when the request message has not been transmitted to the regional computer.

25. In an automatic document controlled dispensing system as set forth in claim 22 including the step of polling each remote station in sequence to ascertain the condition thereof to accept a credit authorization message or a refuse credit message from the regional computer.

26. In an automatic document controlled dispensing system with remote stations and a communication connection with a regional computer, the method comprising the steps of:
 reading coded data from the presented document,
 comparing the coded data with a verification code inserted and stored in a terminal console for verification of the authenticity of the presented document,
 transmitting an authorization request message to the regional computer upon a verification of the authenticity of the read presented document,
 transmitting a credit authorization message or a refuse credit message from the regional computer to a selected remote station in response to an authorization request message,
 selecting an article to be dispensed from the system in response to a credit authorization message, and
 generating a dispensed article value message for transmission to the regional computer for recordal therein.

27. In an automatic document controlled dispensing system as set forth in claim 26 wherein the step of comparing the read code data with a verification code includes the step of comparing read identification data with a customer's identification code inserted into the terminal console.

28. In an automatic document controlled dispensing system with remote stations and a communication connection with a regional computer, the method comprising the steps of:
 verifying the authenticity of a credit document inserted into said system at a terminal console,
 transmitting an authorization request message to the regional computer upon a verification of the authenticity of the inserted credit document,
 transmitting a credit authorization message or a refuse credit message from the regional computer to a selected remote station in response to an authorization request message,
 selecting an article to be dispensed from the system in response to a credit authorization message, and
 generating the receipt at the terminal console identifying the value of an article selected and dispensed.

29. In an automatic document controlled dispensing system as set forth in claim 28 including the step of releasing a credit document inserted into the system upon receipt at a terminal console of a credit authorization message.

30. In an automatic credit card controlled fuel dispensing system with remote stations and a communication connection with a regional computer, the method comprising the steps of:
 reading coded data from a credit card presented to a terminal console at a remote station,
 verifying the authenticity of the credit card inserted into said system at the terminal console from the read coded data,
 setting up an authorization request message for transmission to the regional computer in response to an authenticated credit card,
 transmitting the authorization request message to the regional computer,
 transmitting a credit authorization message from the regional computer to a selected terminal console,
 selecting a fuel dispenser from one of a plurality of said dispensers connected in sets to one terminal console at a remote station and controlled therefrom, and
 actuating a fuel dispenser in response to a selection signal to thereby allow the dispensing of fuel.

31. In an automatic credit card controlled fuel dispensing system as set forth in claim 30 including the step of timing the interval between the selection of a fuel dispenser and the commencing of a dispensing transaction, and terminating a fuel dispensing transaction when the elapsed time exceeds a predetermined maximum limit.

32. In an automatic credit card controlled fuel dispensing system as set forth in claim 30 including the step of monitoring the value of fuel dispensed in a transaction in response to the actuation of a fuel dispenser.

33. In an automatic credit card controlled fuel dispensing system as set forth in claim 32 including the step of terminating a fuel dispensing transaction when the monitored value exceeds a pre-established limit.

34. In an automatic credit card controlled fuel dispensing system as set forth in claim 32 including the step of generating a receipt at the terminal console identifying the value of the fuel dispensed from a selected fuel dispenser.

* * * * *